United States Patent
Kaufmann et al.

(10) Patent No.: US 7,510,038 B2
(45) Date of Patent: Mar. 31, 2009

(54) STEERING SYSTEM WITH LANE KEEPING INTEGRATION

(75) Inventors: Timothy W. Kaufmann, Frankenmuth, MI (US); Charmaine M. Wittig, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 734 days.

(21) Appl. No.: 10/865,208

(22) Filed: Jun. 10, 2004

(65) Prior Publication Data

US 2004/0262063 A1 Dec. 30, 2004

Related U.S. Application Data

(60) Provisional application No. 60/478,038, filed on Jun. 11, 2003.

(51) Int. Cl.
*B62D 1/24* (2006.01)

(52) U.S. Cl. .................. 180/169; 701/41; 701/93; 382/103; 382/104; 180/167; 180/168

(58) Field of Classification Search .......... 701/41, 701/93; 382/103–104; 180/167–169
See application file for complete search history.

(56) References Cited

U.S. PATENT DOCUMENTS

| | | | |
|---|---|---|---|
| 3,575,255 A | 4/1971 | Wickstrom | 180/98 |
| 4,361,202 A | 11/1982 | Minovitch | 180/168 |
| 4,401,181 A | 8/1983 | Schwarz | 180/168 |
| 4,970,653 A | 11/1990 | Kenue | 364/461 |
| 5,154,248 A | 10/1992 | Schwager et al. | 180/168 |
| 5,233,527 A | 8/1993 | Shinnosuke | 364/424.02 |
| 5,245,422 A | 9/1993 | Borcherts et al. | 358/103 |
| 5,390,118 A | 2/1995 | Margolis et al. | 364/424.02 |
| 5,483,453 A | 1/1996 | Uemura et al. | 364/424.02 |
| 5,517,412 A | 5/1996 | Unoura | 364/424.02 |
| 5,568,137 A | 10/1996 | Liu | 340/905 |
| 5,642,093 A | 6/1997 | Kinoshita et al. | 340/439 |
| 5,667,033 A | 9/1997 | Shimizu et al. | 180/272 |
| 5,668,722 A | 9/1997 | Kaufmann et al. | 701/41 |
| 5,704,446 A | 1/1998 | Chandy et al. | 180/446 |
| 5,719,766 A | 2/1998 | Bolourchi et al. | 364/424.052 |

(Continued)

OTHER PUBLICATIONS

Dean Pomerleau & Todd Jochem, "Rapidly Adapting Machine Vision for Automated Vehicle Steering", IEEE Expert, Apr. 1996 at 19.

*Primary Examiner*—Thomas G Black
*Assistant Examiner*—Wae Louie
(74) *Attorney, Agent, or Firm*—Thomas N. Twomey (57) ABSTRACT

A system for steering a vehicle including: an actuator disposed in a vehicle to apply torque to a steerable wheel; a driver input device receptive to driver commands for directing the vehicle; and a sensor for determining an intent of a driver and generating a signal indicative thereof. The system also includes: a lane keeping system for detecting a location of the vehicle relative to a lane marker and generating a lane position signal indicative thereof; a controller in operable communication with the actuator, the driver input device, the first sensor, and the lane keeping system. The controller provides a command to the actuator responsive to the intent of the driver, the lane position, and a desired lane position. The controller executes a lane keeping algorithm consisting of a single control loop based on at least one of the lane position and the lane position deviation.

40 Claims, 4 Drawing Sheets

U.S. PATENT DOCUMENTS

| | | | | |
|---|---|---|---|---|
| 5,765,116 | A | 6/1998 | Wilson-Jones et al. | 701/41 |
| 5,874,892 | A * | 2/1999 | Antonellis et al. | 340/438 |
| 5,913,375 | A * | 6/1999 | Nishikawa | 180/168 |
| 6,014,595 | A | 1/2000 | Kobayashi | 701/1 |
| 6,038,496 | A | 3/2000 | Dobler et al. | 701/3 |
| 6,053,270 | A | 4/2000 | Nishikawa et al. | 180/168 |
| 6,057,754 | A | 5/2000 | Kinoshita et al. | 340/435 |
| 6,070,112 | A | 5/2000 | Sato et al. | 701/41 |
| 6,092,619 | A * | 7/2000 | Nishikawa et al. | 180/446 |
| 6,122,579 | A | 9/2000 | Collier-Hallman | 701/41 |
| 6,151,539 | A | 11/2000 | Bergholz et al. | 701/25 |
| 6,169,940 | B1 | 1/2001 | Jitsukata et al. | 701/23 |
| 6,169,954 | B1 | 1/2001 | McCrary | 701/117 |
| 6,178,365 | B1 * | 1/2001 | Kawagoe et al. | 701/41 |
| 6,212,453 | B1 * | 4/2001 | Kawagoe et al. | 701/41 |
| 6,226,389 | B1 * | 5/2001 | Lemelson et al. | 382/104 |
| 6,226,592 | B1 | 5/2001 | Luckscheiter et al. | 701/301 |
| 6,259,980 | B1 * | 7/2001 | Peck et al. | 701/24 |
| 6,263,270 | B1 * | 7/2001 | Sato et al. | 701/41 |
| 6,269,897 | B1 | 8/2001 | Tamura et al. | 180/168 |
| 6,275,773 | B1 | 8/2001 | Lemelson et al. | 701/301 |
| 6,279,673 | B1 * | 8/2001 | Bohner et al. | 180/167 |
| 6,292,752 | B1 | 9/2001 | Franke et al. | 701/300 |
| 6,308,123 | B1 * | 10/2001 | Ikegaya et al. | 701/41 |
| 6,314,354 | B1 | 11/2001 | Shimizu et al. | 701/41 |
| 6,321,159 | B1 * | 11/2001 | Nohtomi et al. | 701/207 |
| 6,324,452 | B1 | 11/2001 | Ikegaya | 701/41 |
| 6,338,015 | B1 | 1/2002 | Kawagoe et al. | 701/41 |
| 6,343,247 | B2 | 1/2002 | Jitsukata et al. | 701/28 |
| 6,363,305 | B1 | 3/2002 | Kaufmann et al. | 701/41 |
| 6,366,207 | B1 * | 4/2002 | Murphy | 340/576 |
| 6,370,460 | B1 | 4/2002 | Kaufmann et al. | 701/41 |
| 6,449,383 | B1 * | 9/2002 | Oike et al. | 382/104 |
| 6,473,678 | B1 * | 10/2002 | Satoh et al. | 701/41 |
| 6,487,501 | B1 * | 11/2002 | Jeon | 701/301 |
| 6,542,800 | B2 * | 4/2003 | Kawazoe et al. | 701/41 |
| 6,556,909 | B2 * | 4/2003 | Matsumoto et al. | 701/41 |
| 6,600,986 | B2 * | 7/2003 | Steinle et al. | 701/70 |
| 6,633,800 | B1 * | 10/2003 | Ward et al. | 701/2 |
| 6,792,345 | B2 * | 9/2004 | Matsumoto et al. | 701/96 |
| 6,813,557 | B2 * | 11/2004 | Schmidt et al. | 701/200 |
| 6,842,687 | B2 * | 1/2005 | Winner et al. | 701/93 |
| 6,873,911 | B2 * | 3/2005 | Nishira et al. | 701/301 |
| 6,879,896 | B2 * | 4/2005 | Martens | 701/41 |
| 6,906,639 | B2 * | 6/2005 | Lemelson et al. | 340/903 |
| 7,236,870 | B2 * | 6/2007 | Tange et al. | 701/70 |
| 2002/0007239 | A1 * | 1/2002 | Matsumoto et al. | 701/41 |
| 2003/0062769 | A1 * | 4/2003 | Matsumoto et al. | 303/146 |
| 2003/0072471 | A1 * | 4/2003 | Otsuka et al. | 382/103 |
| 2003/0163239 | A1 * | 8/2003 | Winner et al. | 701/93 |
| 2004/0148080 | A1 * | 7/2004 | Ekmark et al. | 701/41 |
| 2004/0262063 | A1 * | 12/2004 | Kaufmann et al. | 180/169 |
| 2007/0198145 | A1 * | 8/2007 | Norris et al. | 701/23 |

* cited by examiner

STEERING SYSTEM WITH LANE KEEPING INTEGRATION

CROSS-REFERENCE TO RELATED APPLICATIONS

This application claims the benefit of U.S. provisional application No. 60/478,038, filed Jun. 11, 2003 the contents of which are incorporated by reference herein in their entirety.

BACKGROUND

The present disclosure relates generally to vehicle steering control systems and, more particularly, to an electric power steering system having a lane keeping function integrated therewith.

A number of vehicle systems have been devised to assist the vehicle in maintaining a central position within a driving lane. Generally, a "lane keeping" system will include a device such as a video camera that gathers information on the current position of the vehicle, along with sensors for detecting certain dynamic state variables of the vehicle. Changes in the curvature of the road path is treated as unknown disturbances. Through the use of information on the deviation of the vehicle from the center of the driving lane, as well as the dynamic state variables of the vehicle, an appropriate feedback indication is provided to the driver.

For example, the feedback indication could be in the form of an audio signal, a visual signal, and/or a haptic signal to the driver. Such a signal would alert the driver that a corrective action may be required if the driver's intent is not to deviate from the center of the driving lane. In addition to driver feedback, the lane keeping system may also be integrated within the steering system of the vehicle to provide a corrective input thereto when a path deviation is detected. However, it may not always be desirable for the lane keeping function to assume total control over the steering but rather to assist the driver in maintaining control of the vehicle's path in accordance with the driver's intent.

Conventional lane keeping systems usually employ a camera system and control system integrated with a steering system to provide a lane keeping assist torque. In addition, such systems may employ various means to evaluate the driver's intent to ascertain whether a torque input in intentional or just a deviation of the vehicle from a desired path. However, such systems are very complex, involving multiple sensor systems and utilize multiple control loops to maintain a lane keeping function. Accordingly, an assistive lane keeping system is desired that provides operator cues to assist an driver with lane keeping, yet may be configured for autonomous operation that is less complex than existing systems.

BRIEF SUMMARY OF THE INVENTION

The above discussed and other drawbacks and deficiencies of the prior art are overcome or alleviated by a system for steering a vehicle comprising: an actuator disposed in a vehicle to apply torque to a steerable wheel; a driver input device disposed in the vehicle receptive to driver commands for directing the vehicle; and a first sensor disposed in the vehicle for determining an intent of a driver and generating a first signal indicative thereof. The system also includes: a lane keeping system for detecting a location of the vehicle relative to a lane marker and generating a lane position signal indicative thereof and transmitting at least one of a lane position signal and a lane position deviation; a controller in operable communication with the actuator, the driver input device, the first sensor, and the lane keeping system. The controller provides a command to the actuator responsive to the intent of the driver, the lane position, and a desired lane position. The controller executes a lane keeping algorithm consisting of a single control loop based on at least one of the lane position and the lane position deviation.

Also disclosed herein in another exemplary embodiment, is a method for steering a vehicle with an electric power steering system, the method comprising: determining an intent of a driver of the vehicle; ascertaining a location of the vehicle relative to a lane marker and generating a lane position signal indicative thereof and transmitting at least one of a lane position signal and a lane position deviation; applying a lane keeping algorithm comprising a single control loop based on at least one of the lane position and the lane position deviation; and generating a command to an actuator disposed in the vehicle to apply torque to a steerable wheel, the command responsive to the intent of the driver, a desired lane position, and the at least one of the lane position and the lane position deviation.

In another exemplary embodiment disclosed herein is a system for steering a vehicle with an electric power steering system comprising: a means for determining an intent of a driver of the vehicle; a means for ascertaining a location of the vehicle relative to a lane marker and generating a lane position signal indicative thereof and transmitting at least one of a lane position signal and a lane position deviation to a controller; a means for applying a lane keeping algorithm comprising a single control loop based on at least one of said lane position and said lane position deviation; and a means for generating a command to an actuator disposed in the vehicle to apply torque to a steerable wheel, the command responsive to the intent of the driver, a desired lane position, and the at least one of the lane position and the lane position deviation.

Further, disclosed herein in another exemplary embodiment is a storage medium encoded with a machine readable computer program code, the code including instructions for causing a computer to implement the abovementioned method for steering a vehicle with an electric power steering system.

Also disclosed herein in yet another exemplary embodiment is computer data signal, the computer data signal comprising code configured to cause a processor to implement the abovementioned method for steering a vehicle with an electric power steering system.

BRIEF DESCRIPTION OF THE DRAWINGS

Referring to the exemplary drawings wherein like elements are numbered alike in the several Figures.

DETAILED DESCRIPTION

Disclosed herein is a lane keeping system integrated with an electric steering system. Existing systems commonly employ multiple control loops to maintain stability. Primarily they include lane position, lane curvature and heading angle control loops. Multiple control loops are often necessitated by low bandwidth of sensors and/or camera system. The lane keeping system of an exemplary embodiment employs a single control loop with lead-lag compensation to provide stable operation with reduced latency with a low bandwidth sensor system and camera. Advantageously, the lane keeping system of an exemplary embodiment operates with a single (only one) lane keeping control loop in a stable configuration reducing complexity, integration effort, and cost relative to existing systems.

The present invention may be utilized in various types of vehicles employing electronic steering or steer by wire systems or with the addition of a electric motor on an hydraulic steering system. A preferred embodiment of the invention, by way of illustration is described herein as it may be applied to an automobile employing an electric power steering system. While a preferred embodiment is shown and described by illustration and reference to an automobile steering system, it will be appreciated by those skilled in the art that the invention is not limited to the automobiles alone by may be applied to all vehicles employing electronic steering systems, steer by wire systems, or even hydraulically controlled steering systems where a lane keeping command may be integrated with existing steering commands.

Figure 1:
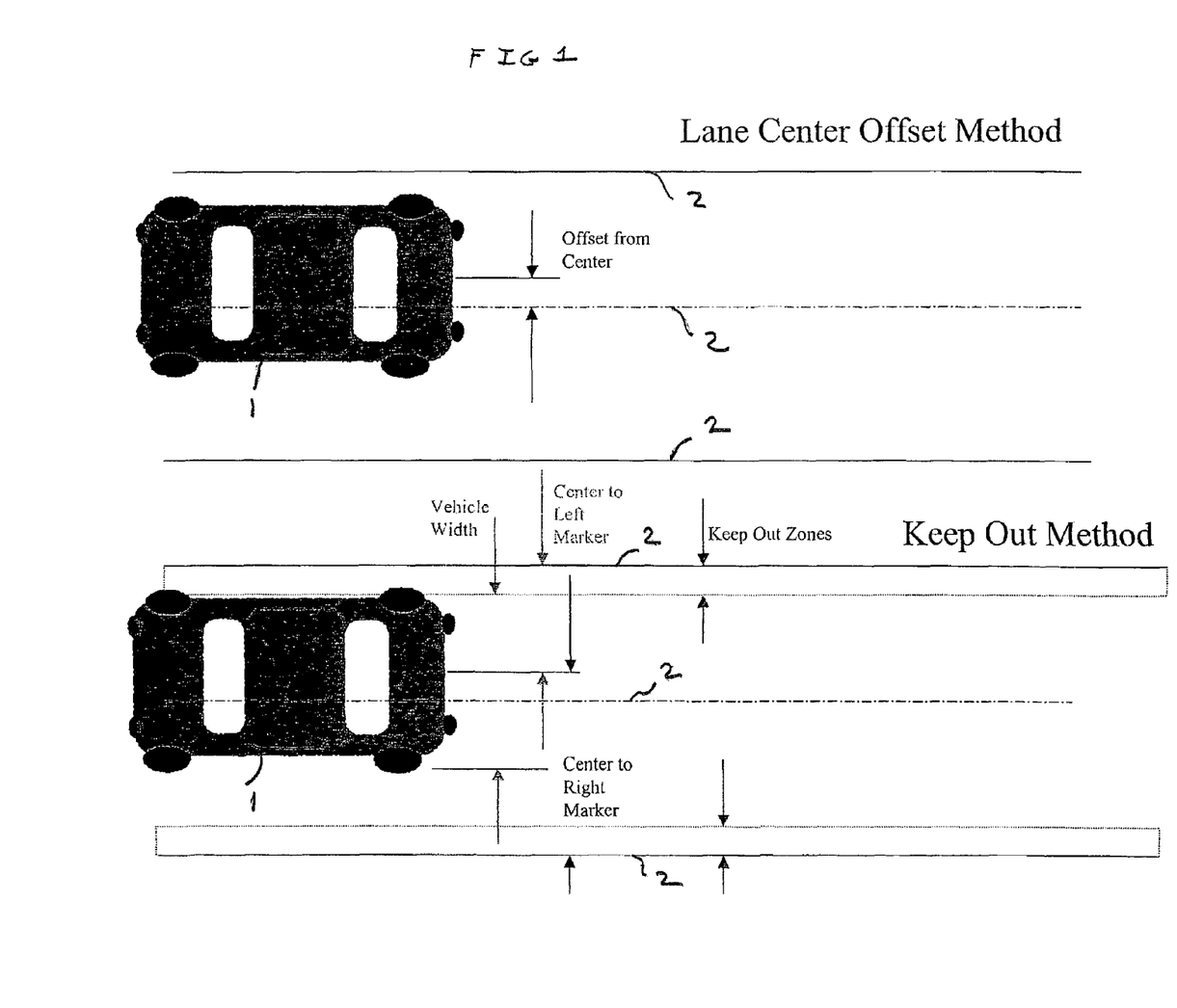
FIG. 1 is a diagram depicting a vehicle in a lane with lane markers.

Referring now to FIG. 1, there is depicted a vehicle 1 in a lane with various lane markers 2 to the left, right, (there is no lane center marker, it is calculated). The lane keeping system provides two modes of operation, a helper or assist mode, and an autonomous mode. In helper mode the operator is hands on, and the system provides audio warning(s) and/or tactic feedback warnings (for example, to simulate the noise/feel of a rumble strip) on the side of the vehicle that indicates the vehicle is approaching a lane marker. The warnings and cues may be overridden by activation of a turn signal indicating operator intent to change lanes. For example, in the helper (assist) mode, because application of torque nudges can cause the vehicle 1 to dart back and forth between lane markers 2 if the driver were not controlling the steering wheel, it desirable to determine if the drivers is, in fact holding the wheel. If so, then a torque nudge may be applied. As disclosed at a later point herein, a pressure/force sensor may be employed to determine if the driver is controlling the steering wheel.

In Autonomous mode the system is enabled after the operator has maintained the vehicle 1 within a tolerance band from the lane center for a selected period. The lane keeping system warns the operator of an impending engagement of the autonomous mode with a chime, and then engages. The autonomous mode maintains the vehicle 1 in the lane and requires no operator input to control the vehicle 1. In an exemplary embodiment, the lane keeping system employs a left marker as the primary marker but can readily transition to the right marker or a center marker if the left marker cannot be identified. For example, in the autonomous mode, the torque sensor is used for determining driver intent. In this mode, the driver may want to make a correction and/or over ride the lane keeping system 100. So, when the driver inputs a torque greater than about 0.25 Nm, the lane keeping system 100 transitions to the helper (assist) mode. When the driver has completed his correction the lane keeping system 100 transitions back to autonomous mode when the driver is within 0.5 meters of the lane center, for a duration of 5 seconds, when both of these conditions have been met the lane keeping system transitions back to the autonomous mode.

Continuing with FIG. 1, the lane keeping system can be configured to operate with either a keep out functionality, or a constant correction from center (with a dead band) functionality. With the keep out functionality, the lane keeping system responds only when the vehicle 1 is within some predefined distance from a boundary line. When the vehicle 1 approaches a boundary line, the system activates a visual warning lamp, audible warnings, and provides a torque nudge to the operator via the steering wheel in the direction away from the lane boundary line. Similarly, with the correction from center functionality, when the vehicle 1 deviates from the center of the lane by a selected offset, the lane keeping system provides a visual warning and torque nudge.

In an exemplary embodiment, the lane keeping system is enabled for a selected speed range of the vehicle 1. The system may be configured to operate only over a small range of total system authority and rates. In an exemplary embodiment, the lane keeping system 100 utilizes ten percent of total system control authority. It will be appreciated that other configurations are conceivable.

Figure 2:
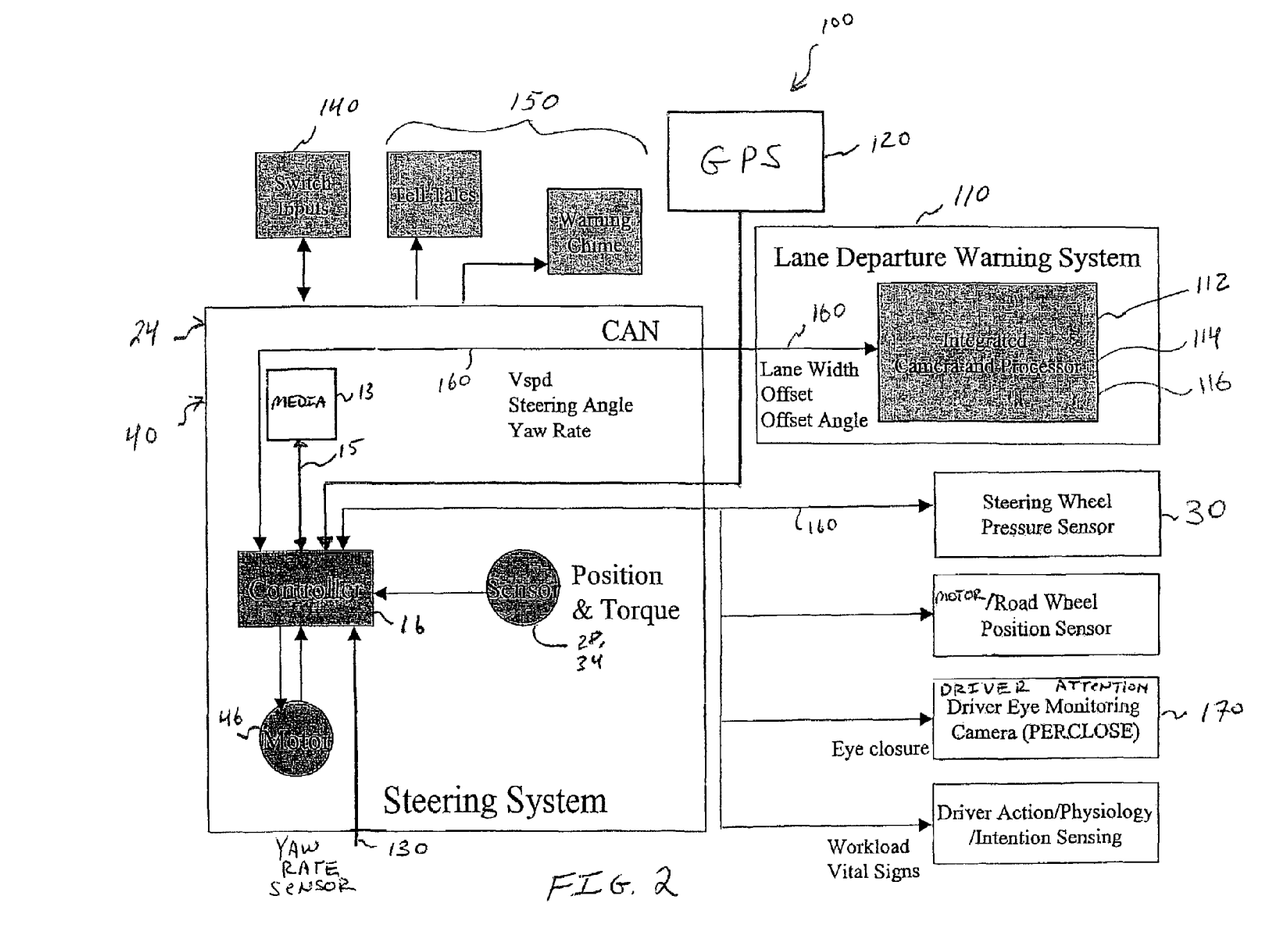
FIG. 2 is a simplified block diagram of a lane keeping system in accordance with an exemplary embodiment.

Referring also to FIG. 2, there is shown a simplified block diagram of a lane keeping system 100 in accordance with an exemplary embodiment. A lane departure warning system 110 including a lane tracking system 112 is integrated with an electric steering system 40. The lane tracking system 112 may include but not be limited to, a camera system for detection of lane markers/markings and computing a lane position signal 114. The lane keeping system 100 is also optionally integrated with auxiliary sensors such as a global positioning system (GPS with map navigation system) 120 and dynamic sensors 130 such as, but not limited to a yaw rate sensor. The lane keeping system 100 is also integrated with various controls 140 and enunciators 150 to provide indications and feedback to the operator.

The integration of GPS may be employed for route planning and navigation. Furthermore, GPS may be employed to inform the lane keeping system 100 when the vehicle 1 is approaching a defined point in the roadway, such as, an exit, but not limited thereto. Under such conditions, the lane keeping system 100 can identify the type of lane marker 2, e.g., dashed or solid. If, for example, the right line is solid, it may be inferred that the vehicle 1 is in the right most lane. The lane keeping system 100 would switch to the left line if the route planning indicates that the intention is to continue along the present course. This switch will ensure that the lane keeping system 100 does not direct the vehicle 1 down the exit. If, on the other hand, it is intended to take the exit, the lane keeping system 100 would be in the right lane (if it is an right exit) and track the right most lane marker 2, to direct the vehicle 1 on to the exit.

In an exemplary embodiment, the lane keeping system also includes a driver attention monitoring device 170. The driver attention monitoring device 170 facilitates the lane keeping system 100 taking action when the operator's attention is not focused on the roadway. The driver attention monitoring device 170 informs the lane keeping system 100 that the driver is at some level of drowsiness/inattentiveness. The driver attention monitoring device 170 includes, but is not limited to a camera system with infrared flood (or equivalent apparatus) to monitor the status of the operator, in particular, an operator's eyes. In one exemplary embodiment the driver attention monitoring device 170 monitors the operator's eye(s) to ascertain a percentage eye closure. The lane keeping system 100 may then employ such a determination by to take action and provide warnings to the operator. For example, the driver attention monitoring device 170 may be employed as an indicator when the driver has taken their eyes off the roadway for a duration exceeding a selected time.

When the driver attention monitoring device 170 ascertains that a driver is inattentive, the lane keeping system 100 responds with torque nudges, if the driver's hands are on the steering wheel 26 (helper (Assist) mode). In addition, audible (raising and lowering of the radio may be part of this feature) and visual warnings may be activated along with steering wheel buzz (as described herein). If the driver does not take control of the vehicle 1 or the driver attention monitoring device 170 does not indicate that the driver is awake, the lane keeping system may enter autonomous mode. The system may communicate to other systems in the vehicle 1 that the driver is not responding. The lane keeping system 100 may be integrated with other systems such as speed control and steering to slow the vehicle 1, or pull off to the side of the road and stop. Moreover in vehicles 1 equipped with OnStar® type capability, the OnStar® system may be activated. Advantageously, such systems may be highly beneficial for cases of medical emergencies and the like.

Figure 3:
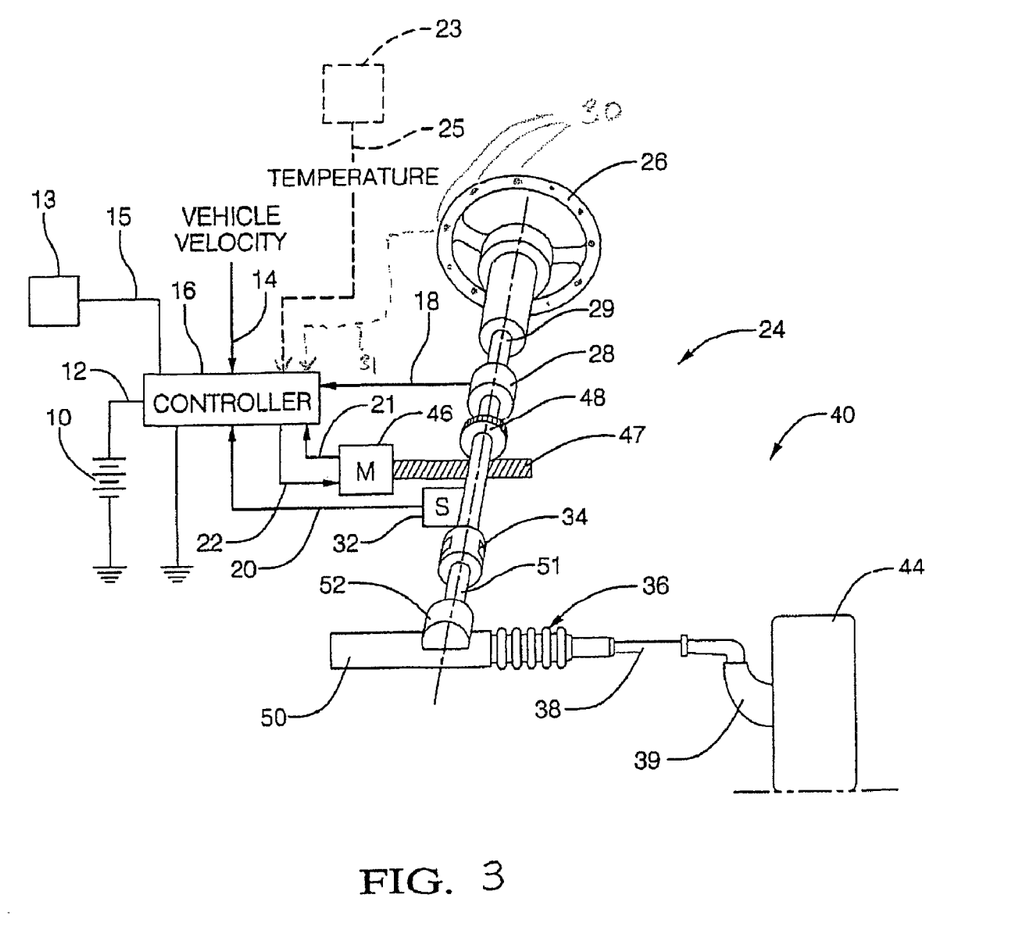
FIG. 3 is a diagram of a steering system in accordance with an exemplary embodiment.

Referring to FIG. 3, reference numeral 40 generally designates a motor vehicle electric power steering system suitable for implementation of the disclosed embodiments. Examples of other steering systems that may be suitable for implementation of the disclosed embodiments may be found in commonly assigned: U.S. Pat. No. 6,122,579 to Collier-Hallman et al.; U.S. Pat. No. 5,704,446 to Chandy et al.; U.S. Pat. No. 5,719,766 to Bolourchi et al.; U.S. Pat. No. 5,668,722 to Kaufmann et al.; U.S. patent application Ser. No. 10/165,037 to Patankar; U.S. Pat. No. 6,363,305 to Kaufmann et al.; and U.S. Pat. No. 6,370,460 to Kaufmann et al. the disclosures of which are incorporated by reference herein in their entirety.

Returning with FIG. 3, the steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g. a hand wheel and the like) is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and an electric machine 46 in this instance a brushless DC motor hereinafter denoted motor 46. The controller 16 is powered by the vehicle power supply 10 through line 12. The controller 16 receives a vehicle speed signal 14 representative of the vehicle velocity. Steering angle is measured through position sensor 32, which may be an optical encoding type sensor, variable resistance type sensor, or any other suitable type of position sensor, and supplies to the controller 16 a position signal 20. Motor velocity may be measured with a tachometer and transmitted to controller 16 as a motor velocity signal 21. A motor velocity denoted $\omega_m$ may be measured, calculated or a combination thereof. For example, the motor velocity $\omega_m$ may be calculated as the change of the motor position $\theta$ as measured by a position sensor 32 over a prescribed time interval. For example, motor speed $\omega_m$ may be determined as the derivative of the motor position $\theta$ from the equation $\omega_m = \Delta\theta/\Delta t$ where $\Delta t$ is the sampling time and $\Delta\theta$ is the change in position during the sampling interval. Alternatively, motor velocity may be derived from motor position as the time rate of change of position. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is the preferable torque sensor, any other suitable torque-sensing device used with known signal processing techniques will suffice. In response to the various inputs, the controller sends a command 22 to the electric motor 46, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing a motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, or more specifically switched reluctance motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 46. Controller 16 is configured to develop the necessary voltage(s) out of inverter (not shown), which may optionally be incorporated with controller 16 and will be referred to herein as controller 16, such that, when applied to the motor 46, the desired torque or position is generated. Because these voltages are related to the position and speed of the motor 46 and the desired torque, the position and/or speed of the rotor and the torque applied by an operator are determined. A position encoder is connected to the steering shaft 51 to detect the angular position $\theta$. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 46.

Desired torque may be determined by one or more torque sensors 28 transmitting torque signals 18 indicative of an applied torque. An exemplary embodiment includes such a torque sensor 28 and the torque signal(s) 18 therefrom, as may be responsive to a compliant torsion bar, T-bar, spring, or similar apparatus (not shown) configured to provide a response indicative of the torque applied. In addition, steering wheel pressure may be determined by one or more force/pressure sensors 30 at the steering wheel 26. The force/pressure sensors 30 generate force/pressure signals 31 indicative of an applied pressure to steering wheel 26, which are transmitted to the controller 16.

Optionally, a temperature sensor(s) 23 located at the electric machine 46. Preferably, the temperature sensor 23 is configured to directly measure the temperature of the sensing portion of the motor 46. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the abovementioned are also commonly linearized, compensated, and filtered as desired or necessary to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the lane keeping and steering functions, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

As exemplified herein and disclosed above one such process may be a lane-keeping algorithm. Controller 16 receives various input signals including, but not limited to, those identified above, to facilitate such processing and may provide one or more output signals in response. Also received by the controller 16 are a variety of implementation specific parameters, signals and values for initialization and characterization of the prescribed processes and to identify various states of the processes herein.

Controller 16 may also be interfaced with a communications bus 160 to facilitate communications in the vehicle 1. In an exemplary embodiment a serial communications bus, denoted CAN is employed. The CAN enables communications with the lane departure warning system 110 and an optional GPS and map navigation system 120. It will be appreciate that the communications bus 160 may be employed for communication with various sensors, systems, actuators and the like. For example, in an exemplary embodiment, the communications bus provides communications between the lane tracking system lane departure warning system 110 and steering system 40. More particularly, the communications bus 160 is employed to transmit lane position to the steering system 40 and transmit various vehicle parameters to the lane departure warning system 110. The GPS may use NEMA-0183 RS-232 bus utilized in Marine Systems or similar equivalent communications interfaces.

Turning now to the lane departure warning system 110 and more particularly the lane keeping system 112, in an exemplary embodiment the lane keeping system 112 employs an optical sensor 114 and image processing system 116 that detects and tracks lane markings 2. When an unplanned or uninitiated lane departure is detected, a warning signal is generated. The warning signal indicates on which side of the vehicle 1/lane the departure is occurring. In addition, the lane keeping system 112 transmits data regarding the position of the vehicle 1 in the lane and an estimate of road curvature. In an exemplary embodiment, the AutoVue™ system form Iteris™ Inc. is configured for application as the lane keeping system 112, however other systems with similar capabilities are feasible. The lane keeping system employs a ruggedized, embedded image capture and analysis computer. An imaging sensor creates a two dimensional digitized image of the area ahead of the vehicle 1. The computer provides algorithms for analysis of the captured image information to ascertain desired information including, but not limited to lane position, deviation from desired lane position, and roadway curvature.

Figure 4:
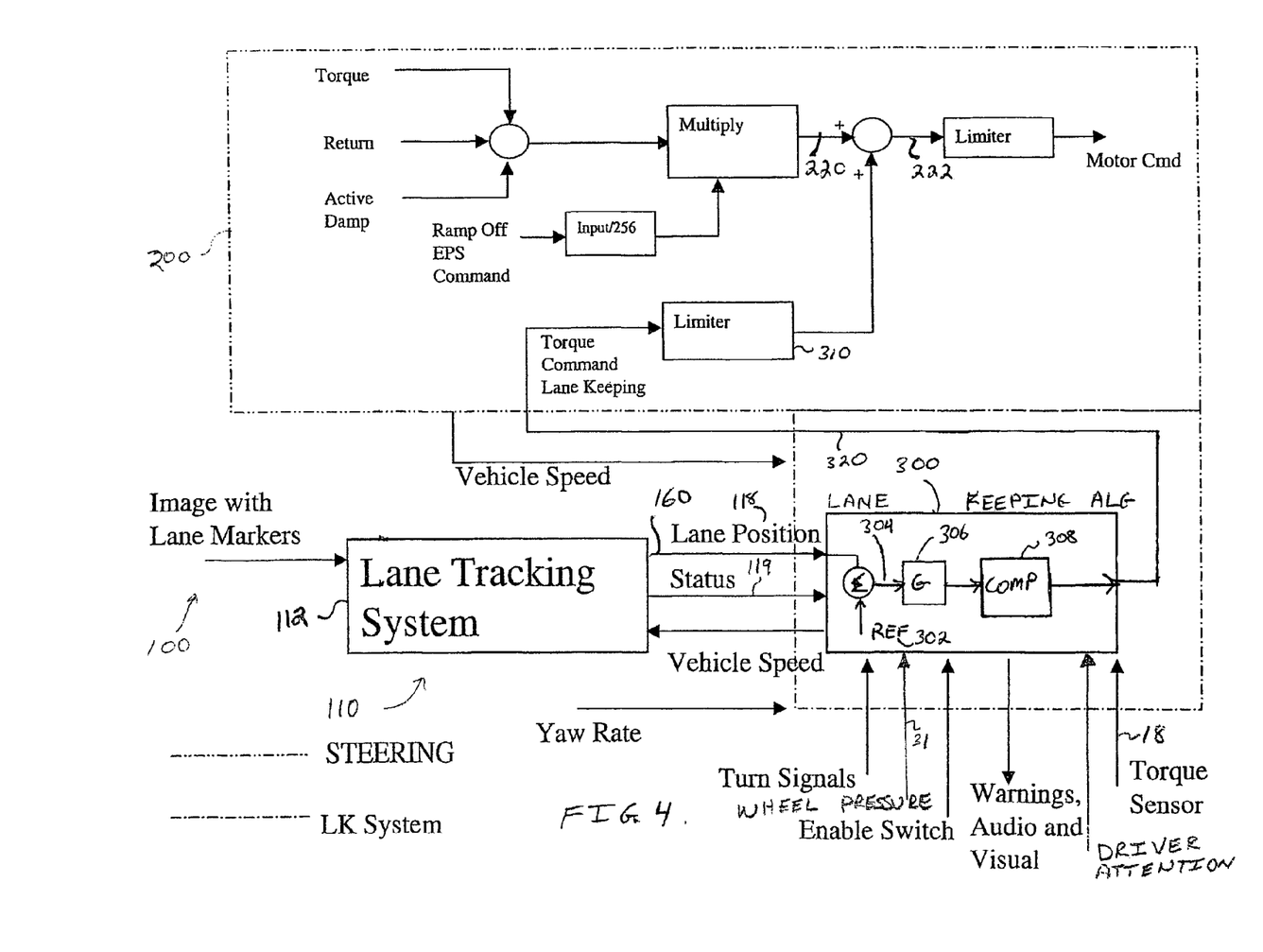
FIG. 4 is a simplified block diagram of an exemplary methodology for lane keeping in accordance with an exemplary embodiment

In an exemplary embodiment, the lane keeping system 112 includes an interface to the communications bus 160 for interfacing with the vehicle 1 and more particularly the steering system 40. The frame rate, response time, and data rate of the lane keeping system 112 and communications bus 160 is configured to ensure a latency of less than about 44 milliseconds for communication of information to the steering system 40. Turning now to FIG. 4 a simplified block diagram of an illustrative system and methodology for lane keeping in accordance with an exemplary embodiment is depicted. Similar configurations are employed for applying torque commands to the steering system responsive to the Lane keeping system 100. In the helper or assist mode, audible warning(s), visual enunciations (e.g., telltale on the instrument panel) and/or tactile feedback warnings are generated (for example, to simulate the noise/feel of a rumble strip) or torque disturbances (nudges) or torque resistance on the side of the vehicle 1 that indicates the vehicle 1 is approaching a lane marker. Tactile feedback may be achieved with a separate oscillatory actuator, for example, a motor with and eccentric weight applied to the steering wheel of the vehicle 1 or via existing steering actuators. The warnings and cues may be overridden by activation of a turn signal indicating operator intent to change lanes. In the autonomous mode, the lane keeping system 100 warns the operator with an audible warning of an impending engagement of the autonomous mode, and then engages, providing steering corrections to maintain the vehicle 1 on the marked roadway. Similarly, the lane keeping system 100 may be employed to provide feedback to the operator in instances when a lane change is intended but the operator has not indicated the intention by employing a turn signal. In an exemplary embodiment, the lane keeping system employs a left marker 2 as the primary lane marker 2 but can readily transition to the right lane marker 2 if the left lane marker 2 cannot be identified. Such transitions would be automated and essentially transparent to the operator. In an exemplary embodiment, the lane keeping system may also maintain an estimate of the lane width. Lane width is calculated when both left and right lane markers 2 are present. When one of the lane markers 2 cannot be found, the lane width is maintained and not recalculated until both markers 2 are present once again.

Transitions between the helper mode and autonomous mode may be operator selected or automated based on determinations of driver intent. For example, engagement of a turn signal is employed as an indication of driver intent to turn or change lanes. In addition, in an exemplary embodiment transitions application of a torque to the steering wheel 26 for a selected duration is utilized as an indication of driver intent to make a driver input e.g., turn or change lanes. Under such conditions, the lane keeping system 100 automatically transitions from the autonomous mode to the helper mode. Conversely, in one embodiment, when in the helper mode, maintaining the vehicle 1 within a selected position tolerance in the lane for a selected duration enable transitioning to the autonomous mode.

Similarly, under selected conditions, steering wheel force/pressure is employed as an indicator that the operator intends to be making steering corrections, and therefore is employed for selected mode transitions. In exemplary embodiment transitions the presence of steering wheel force/pressure for a selected duration is utilized as an indication of driver intent to make a driver input e.g., turn or change lanes. Likewise, in another exemplary embodiment, under selected conditions, steering wheel rate or torque rates may be employed as an indicator that the operator intends to be making steering corrections, and therefore is employed for selected mode transitions. Under such conditions, the lane keeping system 100 automatically transitions from the autonomous mode to the helper mode. It will be appreciated that determination of driver intent is a note necessarily deterministic and that turn signals, torque applied to the steering wheel, and steering wheel force/pressure are only indicators of driver intent. Therefore, each of the various sensors alone or in combination may be employed to ascertain driver intent with varying degrees of accuracy.

Returning to FIG. 4, a steering torque control algorithm 200 is depicted with the addition of a lane-keeping algorithm 300. In an exemplary embodiment, controller 16 of the steering system 40 executes the algorithms of the lane keeping functions as well as the algorithms for the steering functions. The lane tracking system 112 tracks lane markers 2 generally on the roadway to ascertain a lane position. The lane tracking system 112 transmits various signals to the lane keeping algorithm 300, including, but not limited to a signal indicative of lane position 118 and a status and/or validity of the data 119. The lane-keeping algorithm 300 receives lane position signal 118, vehicle status signals, an enable signal as well as vehicle parameters such as, but not limited to, vehicle speed, torque and optionally yaw rate. The lane-keeping algorithm 300 formulates a lane keeping command 320 that is combined with the vehicle steering system motor torque command 220 of the steering control algorithm 200 to formulate a composite steering torque command 222 that is ultimately directed to the steering motor 46.

Turning now to FIG. 5 as well, in an exemplary embodiment, to maintain stability of the lane-keeping system 100, and more specifically the lane keeping algorithm 300 employs only a single control loop based on lane position e.g., 118 and/or lane position deviation as an input to a steering torque control algorithm 200. Conversely, existing systems generally utilize multiple control loops to ensure stability. Advantageously, a single control loop is simpler to implement and often more readily tuned and optimized to achieve desired performance of the lane keeping system 100.

As stated above, the lane keeping algorithm 300 receives a signal indicative of a position 118 for comparison with a reference 302 e.g., lane center, and the like, to ascertain a lane deviation 304. Alternatively, the lane keeping system 112 could compute a lane deviation 304 from a selected reference and transmit the deviation to the lane keeping algorithm 300. While it is described herein that the lane keeping algorithm 300 performs a computation to ascertain a lane position deviation 304, it will be appreciated that there are numerous means of implementation for ascertaining the deviation of the vehicle 1 from a selected reference lane position 302, all of which should be considered within the scope of the claims. Continuing with the lane keeping algorithm 300 the lane position deviation is applied to a selected loop gain 306 to ultimately formulate a lane keeping command 320 for the steering algorithm 200.

It will be appreciated that to maintain stability of the lane-keeping system 100, the lane keeping control algorithm 300 may include a compensator 308 to address the bandwidth and/or dynamic characteristics of various system elements. For example, based on the update rates and latency of the lane departure warning system 100 e.g. cameras 114 and associated processing 116, additional compensation may be required. In an exemplary embodiment a lead-lag type compensator 308 is coupled in the lane keeping motor torque control loop to provide sufficient phase lead to maintain stability. Furthermore, in an exemplary embodiment, the compensator 308 is configured to provide stability of the lane keeping system 100 at sufficient gains to achieve an overall lane keeping loop bandwidth greater than about 3 Hz, preferably greater than about 5 Hz.. Once again, while a particular implementation is described as an exemplary embodiment, it will be appreciated that other configurations may be possible and within the scope of the claims.

It will be appreciated that the lane keeping control algorithm 300 and/or steering torque control algorithm 200 may optionally include one or more limiters 310 to address clamping the magnitude of the contribution to the composite steering torque command 222 from the lane keeping command 320. For example, in an exemplary embodiment a limiter 310 constrains the maximum contribution to no more than 5 Newton-meters (Nm) of bias torque to the steering algorithm 100 to limit lane keeping inputs to the steering system 40.

It will be appreciated that while the disclosed embodiments refer to a configuration utilizing gain e.g. 306 or scaling in implementation, various alternatives will be apparent. It is well known that such gain as depicted may be implemented employing numerous variations, configurations, and topologies for flexibility. For example, the processes described above could employ in addition to or in lieu of scaling gains, look-up tables, direct algorithms, parameter scheduling or various other methodologies, which may facilitate execution of the desired functions, and the like, as well as combinations including at least one of the foregoing.

In a similar manner, it will be appreciated that the compensator 308 may be implemented employing a variety of methods including but not limited to passive, active, discrete, digital, and the like, as well as combinations including at least one of the foregoing. More over the compensator 308 as disclosed are illustrative of an exemplary embodiment and is not limiting as to the scope of what may be employed. It should also be noted, that in an exemplary embodiment compensator 308 could also take the form of simple scaling, scheduling look-up tables and the like as desired to tailor the content or spectral content of the position signals employed as compensation. Such configuration would depend on the constraints of a particular control system and the level of compensation required to maintain stability and/or achieve the desired control loop response characteristics.

Turning now to the particulars of selecting the proper transfer function for the compensator 308. In an exemplary embodiment, the compensator 308 is depicted with a first-order lead-lag exhibiting a substantially constant gain at frequencies above a cutoff. An advantageous feature of the exemplary embodiment disclosed herein is that it provides opportunity to tune the performance of the lane keeping control algorithm 300 independent of the steering algorithm 200 and ultimately the steering system 40 to satisfy a variety of desired characteristics. Furthermore, it will be appreciated that the compensator 308 is configured as illustrated based on the dynamic characteristics of the components e.g., lane departure warning system 110 for a given implementation. Utilization of higher bandwidth components e.g., lane keeping system 100, processing, actuators 46 and the like as well as combinations including any of the foregoing, may readily yield simplification or elimination of compensation elements yet still permit maintaining stability of the lane keeping system 100. It is also noteworthy to appreciate that increasing the bandwidth of the steering algorithms 200, lane keeping system 100 and/or lane keeping algorithm 300, or overall steering system 40 may also improve the total dynamic characteristics of the of the lane keeping system 100. As a result, a compensation means such as compensator 308 may be designed so that increases the bandwidth of the steering algorithms 200, lane keeping algorithms 300, and/or the entire steering system 40 also changes the dynamic characteristics of the lane keeping system 100. Once again, bandwidth increases in one part of the system may provide for improved performance and/or relaxed requirements for other portions of the system.

It should also be noted that the figures may depict additional elements, connections, interconnections and the like as may be employed for implementation of a selected control configuration. For example, transport delays may be employed to ensure that date time coherency is addressed. Likewise, scaling may be employed to address unit conversions and the like, and limiters may be employed to clamp selected signals.

As will be appreciated, the disclosed invention can be embodied in the form of computer or controller implemented processes and apparatuses for practicing those processes. The present invention can also be embodied in the form of computer program code containing instructions embodied in tangible media 13, such as floppy diskettes, CD-ROMs, hard drives, or any other computer-readable storage medium, wherein, when the computer program code is loaded into and executed by a computer or controller, the computer becomes an apparatus for practicing the invention. The present invention may also be embodied in the form of computer program code or signal 15, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be appreciated that the use of first and second or other similar nomenclature for denoting similar items is not intended to specify or imply any particular order unless otherwise stated.

While the invention has been described with reference to a preferred embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for steering a vehicle comprising:
an actuator disposed in a vehicle to apply torque to a steerable wheel;
a driver input device comprising a hand wheel disposed in said vehicle operative to receive a steering command for controlling a direction of said vehicle comprising a torque applied by a driver to said hand wheel;
a first sensor disposed in said vehicle for sensing said torque applied by said driver to said hand wheel and generating a first signal indicative thereof;
a lane keeping system for detecting a location of said vehicle relative to a lane marker and generating a lane position signal indicative thereof and transmitting at least one of a lane position signal and a lane position deviation;
a controller in operable communication with said actuator, said driver input device, said first sensor, and said lane keeping system, said controller providing a command to said actuator responsive to said steering command of said driver, said lane position, and a desired lane position; and
wherein said controller executes a lane keeping algorithm comprising a single control loop based on at least one of said lane position and said lane position deviation, and wherein said lane keeping algorithm includes a helper mode and an autonomous mode, wherein the helper mode is at least one of enabled and disabled responsive to receiving said first signal and determining that said torque applied by said driver to said hand wheel is a steering command for controlling a direction of said vehicle.

2. The system of claim 1 further including:
a second sensor in operable communications with said driver input device and said controller for detecting at least one of a force and pressure applied to said driver input device and generating a signal indicative of said at least one of said force and said pressure; and
wherein said command to said actuator is further responsive to said signal indicative of at least one of said force and said pressure.

3. The system of claim 1 further including a vehicle speed sensor, said vehicle speed sensor generating a vehicle speed signal and electrically connected to said controller wherein said command is also responsive to said vehicle speed signal.

4. The system of claim 1 further including a driver attention monitoring system to ascertain attentiveness of a driver, wherein said command is further responsive to said driver attention monitoring system to provide tactile and audible feedback to said driver.

5. The system of claim 1 wherein said autonomous mode is least one of enabled and disabled; responsive to receiving said first signal and determining that said torque applied by said driver to said hand wheel is a steering command for controlling a direction of said vehicle.

6. The system of claim 1 wherein said helper mode includes providing at least one of tactile and audible feedback to a driver to assist in maintaining said desired lane position.

7. The system of claim 1 wherein said autonomous mode includes providing audible feedback to a driver and maintaining said desired lane position with a selected tolerance.

8. The system of claim 1 wherein said lane keeping system includes an optical sensor and image processing system for detecting and tracking said lane marker and determining a position of the vehicle relative thereto.

9. The system of claim 1 wherein said lane keeping system with the system exhibits a bandwidth greater than or equal to about 3 Hertz.

10. The system of claim 1 wherein said lane keeping system with the system exhibits a bandwidth greater than or equal to about 5 Hertz.

11. The system of claim 1 wherein said lane keeping algorithm further includes a limiter to control a magnitude of said command to said actuator.

12. The system of claim 1 wherein a lane keeping algorithm further includes a compensator configured to maintain stability of said single control loop.

13. The system of claim 12 wherein said compensator comprises at least one zero.

14. The system of claim 13 wherein said compensator comprises at least one pole.

15. The system of claim 12 wherein said compensator comprises a pole placed at about 10 Hertz and a zero placed at about one tenth Hertz.

16. The system of claim 1 further including a global positioning system in operable communication with at least one of said controller and said lane keeping system, said global positioning system configured to facilitate a determination of a geographic location of said vehicle and selection of a desired course on a roadway.

17. The system of claim 1 wherein said first sensor includes at least one of a torque sensor, a steering angle sensor, a steering rate sensor, and a motor velocity sensor and said signal is at least one of a torque signal, a steering angle signal, a steering rate signal, and a motor velocity signal; and wherein said command to said actuator is also responsive to at least one of a torque signal, a steering angle signal, a steering rate signal, and a motor velocity signal.

18. The system of claim 1 further comprising a turn indicator operative to receive a driver input indicative of a direction of an intended turn and output a second signal to the controller operative to disable the helper mode.

19. A storage medium encoded with a machine readable computer program code, said code including instructions for causing a computer to implement a method for steering a vehicle with an electric power steering system, the method comprising:
  receiving a first signal indicative of a torque applied by a driver to a hand wheel operative to control a direction of said vehicle;
  ascertaining a location of the vehicle relative to a lane marker and generating a lane position signal indicative thereof and transmitting at least one of a lane position signal and a lane position deviation to a controller;
  applying a lane keeping algorithm comprising a single control loop based on at least one of said lane position and said lane position deviation, wherein said lane keeping algorithm includes a helper mode and an autonomous mode and said helper mode is at least one of enabled and disabled responsive to receiving said first signal and determining that said torque applied by said driver to said hand wheel is a steering command for controlling a direction of said vehicle; and
  generating a command to an actuator disposed in the vehicle to apply torque to a steerable wheel, said command responsive to said steering command of said driver, a desired lane position, and said at least one of said lane position and said lane position deviation.

20. A computer data signal, said computer data signal comprising code configured to cause a processor to implement a method for steering a vehicle with an electric power steering system, the method comprising:
  receiving a first signal indicative of a torque applied by a driver to a hand wheel operative to control a direction of said vehicle;
  ascertaining a location of the vehicle relative to a lane marker and generating a lane position signal indicative thereof and transmitting at least one of a lane position signal and a lane position deviation to a controller;
  applying a lane keeping algorithm comprising a single control loop based on at least one of said lane position and said lane position deviation, wherein said lane keeping algorithm includes a helper mode and an autonomous mode and said helper mode is at least one of enabled and disabled responsive to receiving said first signal and determining that said torque applied by said driver to said hand wheel is a steering command for controlling a direction of said vehicle; and
  generating a command to an actuator disposed in the vehicle to apply torque to a steerable wheel, said command responsive to said steering command of said driver, a desired lane position, and said at least one of said lane position and said lane position deviation.

21. A system for steering a vehicle with an electric power steering system comprising:
  a means for receiving a first signal indicative of a torque applied by a driver to a hand wheel operative to control a direction of said vehicle;
  a means for ascertaining a location of the vehicle relative to a lane marker and generating a lane position signal indicative thereof and transmitting at least one of a lane position signal and a lane position deviation to a controller;
  a means for applying a lane keeping algorithm comprising a single control loop based on at least one of said lane position and said lane position deviation, wherein said lane keeping algorithm includes a helper mode and an autonomous mode and said helper mode is at least one of enabled and disabled responsive to receiving said first signal and determining that said torque applied by said driver to said hand wheel is a steering command for controlling a direction of said vehicle; and
  a means for generating a command to an actuator disposed in the vehicle to apply torque to a steerable wheel, said command responsive to said steering command of said driver, a desired lane position, and said at least one of said lane position and said lane position deviation.

22. A method for steering a vehicle with an electric power steering system, the method comprising:
  receiving a first signal indicative of a torque applied by a driver to a hand wheel operative to control a direction of said vehicle;
  ascertaining a location of the vehicle relative to a lane marker and generating a lane position signal indicative thereof and transmitting at least one of a lane position signal and a lane position deviation to a controller;
  applying a lane keeping algorithm comprising a single control loop based on at least one of said lane position and said lane position deviation, wherein said lane keeping algorithm includes a helper mode and an autonomous mode and said helper mode is at least one of enabled and disabled responsive to receiving said first signal and determining that said torque applied by said driver to said hand wheel is a steering command for controlling a direction of said vehicle; and
  generating a command to an actuator disposed in the vehicle to apply torque to a steerable wheel, said command responsive to said steering command of said driver, a desired lane position, and said at least one of said lane position and said lane position deviation.

23. The method of claim 22 further including:
  detecting at least one of a force and pressure applied to a driver input device and generating a signal indicative of said at least one of said force and said pressure; and wherein said command is further responsive to said signal indicative of at least one of said force and said pressure.

24. The method of claim 22 further including ascertaining a vehicle speed and generating a vehicle speed signal and wherein said command is also responsive to said vehicle speed signal.

25. The method of claim 22 further including:

ascertaining attentiveness of a driver employing a driver attention monitoring system, wherein said command is further responsive to said attentiveness of said driver; and providing tactile and audible feedback to said driver.

26. The method of claim 22 wherein said autonomous mode is least one of enabled and disabled responsive to receiving said first signal and determining that said torque applied by said driver to said hand wheel is a steering command for controlling a direction of said vehicle.

27. The method of claim 22 wherein said helper mode includes providing at least on of tactile and audible feedback to a driver to assist in maintaining said desired lane position.

28. The method of claim 22 wherein said autonomous mode includes providing audible feedback to a driver and maintaining said desired lane position with a selected tolerance.

29. The method of claim 22 wherein said ascertaining is accomplished with lane keeping system including a an optical sensor and image processing system for detecting and tracking said lane marker and determining a position of the vehicle relative thereto.

30. The method of claim 22 wherein said control loop including said ascertaining, said lane keeping algorithm, and said actuator exhibits a bandwidth greater than or equal to about 3 Hertz.

31. The method of claim 22 wherein said control loop including said ascertaining, said lane keeping algorithm, and said actuator exhibits a bandwidth greater than or equal to about 5 Hertz.

32. The method of claim 22 wherein said lane keeping algorithm further includes a limiting a magnitude of said command to said actuator.

33. The method of claim 22 wherein a lane keeping algorithm further includes a compensation configured to maintain stability of said single control loop.

34. The method of claim 33 wherein said compensation comprises at least one zero.

35. The method of claim 34 wherein said compensation comprises at least one pole.

36. The method of claim 33 wherein said compensation comprises a pole placed at about 10 Hertz and a zero placed at about one tenth Hertz.

37. The method of claim 22 further including determining a geographic location of said vehicle and selecting of a desired course on a roadway.

38. The method of claim 37 wherein said determining is based on a global positioning system.

39. The method of claim 22 wherein said steering command includes at least one of a torque signal, a steering rate signal, a steering angle, and a motor velocity signal.

40. The method of claim 22 wherein said steering command includes a direction of an intended turn.

* * * * *